United States Patent
Mohan et al.

(10) Patent No.: US 8,578,280 B2
(45) Date of Patent: Nov. 5, 2013

(54) METHOD AND SOFTWARE FOR ENABLING N-WAY COLLABORATIVE WORK OVER A NETWORK OF COMPUTERS

(75) Inventors: John J. Mohan, Douglaston, NY (US); Moises Lejter, Providence, RI (US); Stephen Greene, St. John's, CA (US)

(73) Assignee: Rosebud LMS, Inc., Great Neck, NY (US)

( * ) Notice: Subject to any disclaimer, the term of this patent is extended or adjusted under 35 U.S.C. 154(b) by 0 days.

(21) Appl. No.: 13/229,371

(22) Filed: Sep. 9, 2011

(65) Prior Publication Data

US 2011/0320936 A1     Dec. 29, 2011

Related U.S. Application Data

(63) Continuation of application No. 12/201,355, filed on Aug. 29, 2008, now Pat. No. 8,046,699, which is a continuation of application No. 10/127,777, filed on Apr. 22, 2002, now Pat. No. 7,454,760.

(51) Int. Cl.
*G06F 3/00* (2006.01)
*G06F 15/16* (2006.01)

(52) U.S. Cl.
USPC ............ 715/751; 715/748; 715/753; 715/759; 709/204; 709/217; 709/227; 709/248

(58) Field of Classification Search
USPC .......... 715/748, 751, 753, 759; 709/204, 205, 709/217–220, 227, 248
See application file for complete search history.

(56) References Cited

U.S. PATENT DOCUMENTS

| | | | |
|---|---|---|---|
| 6,195,685 B1 | 2/2001 | Mukherjee et al. | |
| 6,342,906 B1 | 1/2002 | Kumar et al. | |
| 6,353,851 B1 | 3/2002 | Anupam et al. | |
| 6,360,250 B1 | 3/2002 | Anupam et al. | |
| 6,574,674 B1 | 6/2003 | May et al. | |
| 6,687,878 B1 | 2/2004 | Eintracht et al. | |
| 7,814,184 B2 * | 10/2010 | Mandato et al. | 709/221 |
| 2001/0025299 A1 | 9/2001 | Chang et al. | |
| 2002/0052932 A1 | 5/2002 | Curtis et al. | |
| 2002/0065912 A1 | 5/2002 | Catchpole et al. | |
| 2003/0101235 A1 | 5/2003 | Zhang | |
| 2004/0054670 A1 | 3/2004 | Noff et al. | |

* cited by examiner

*Primary Examiner* — Tadeese Hailu
(74) *Attorney, Agent, or Firm* — Andrews Kurth LLP; Sean Wooden

(57) ABSTRACT

Method, software, and system for efficiently enabling n-way collaborative work using common software over a network of computers. In a preferred embodiment of the invention, each participant in a collaborative session starts up a common software application, which includes a collaboration component. This collaboration component is used to establish a common session that includes all interested parties. The collaboration component replicates operations performed on any one instance of said application to all other instances participating in the same session, so the effect is as if all members of the session were sharing a single instance of the application on a single computer. In one aspect, the collaboration component also supports broadcast of audio and video over a computer network, to enable session participants to see and/or hear each other, and further includes other features that support collaborative work.

20 Claims, 17 Drawing Sheets

AcrobatProxy — 910

+addHighlightAnnotation( pageNumber : int, coords : int[], quadpoints : int[],typeOfAnnot: String ) : void
+addInkAnnotation( pageNumber : int, boundBox : int[], inkList : int[]) : void
+addTextAnnotation( pageNumber : int, coords : Int[], text : String ) : void
+changeControl( mode : int ) : void
+controlRequested( mode : int ) : void
+documentOpened( docName : String ) : void
+executePendingRequests() : void
+highlightAnnotationAdded( pageNumber : int, coords : int[], quadpoints : int[], typeOfAnnot : String ) : void
+inkAnnotationAdded( pageNumber : int, boundBox : int[], inkList : int[]) : void
+OpenDocument( filename : String ) : void
+pageSelected( pageNumber : int ) : void
+selectPage( pageNumber : int ) : void
+textAnnotationAdded( pageNumber : int, coords : int[], text : String ) : void

*Fig. 9a*

METHOD AND SOFTWARE FOR ENABLING N-WAY COLLABORATIVE WORK OVER A NETWORK OF COMPUTERS

CROSS-REFERENCE TO RELATED APPLICATIONS

This application is a continuation of U.S. patent application Ser. No. 12/201,355, filed Aug. 29, 2008, now U.S. Pat. No. 8,046,699, which is a continuation of U.S. patent application Ser. No. 10/127,777, filed Apr. 22, 2002, now U.S. Pat. No. 7,454,760,which is are both hereby incorporated by reference in their entirety.

BACKGROUND

Collaborative work over the Internet, as an alternative to actual face-to-face meetings, has been growing in popularity. Discussions and lectures can be held while individual participants are in geographically distant locations.

A major requirement for efficient collaborative work of this kind is the ability to view a common document—whether a text document, overheads for a lecture, or a multimedia presentation. This preferably includes the ability to allow all participants to examine the document, the ability to direct everyone's attention to a specific item or page of the document, and the ability to add annotations that are visible (and perhaps modifiable) by all participants in the meeting. Further distinctions are possible: (i) one can distinguish between "synchronous collaboration" and "asynchronous collaboration"; and (ii) one can distinguish between "one-way collaboration" and "n-way" collaboration. In "synchronous collaboration," all collaboration activities occur online, and participants interact in real-time. In "asynchronous collaboration," collaboration activities can occur at different times for each participant. In "one-way collaboration," only one of the participants can manipulate the shared document—the others are just "along for the ride" (i.e., able only to view). In "n-way collaboration," any of the participants can perform operations that are then visible also to all fellow participants.

Two approaches are commonly used to provide these abilities. The first approach is to use a universal document representation scheme and install on the workstations of all participants an application able to manipulate documents. In some cases, the application has been enhanced to support collaborative work. This is the more common approach. HTML is typically chosen as the representation scheme, and a web browser (e.g., Netscape or Internet Explorer) is the common application. But such a scheme has disadvantages: web browsers do not "abstract away" from workstation-specific issues, such as screen size and resolution. As a result, products may be unable, for example, to place a highlighter in the same spot in the document as viewed by all participants in a session, causing obvious confusion.

The other common approach—known as "application sharing"—assumes that there is not one application common to all participants. To solve that problem, a single workstation is chosen to run the application needed to manipulate the document. The user at that workstation manipulates the document directly. Each of the other users is presented with a dynamically-updated snapshot of the screen window displayed by the application on the workstation. The remote users are able to manipulate the joint document through the replication of low-level events (such as mouse motion and keyboard operation) from the remote user's computers (where the snapshot is shown) to the workstation (where the application actually runs). There are at least two shortcomings to this approach: (a) it can be expensive, in terms of bandwidth required to replicate the snapshot across all remote computers; and (b) it can create a substantial security risk, since the technology used to replicate low-level events can be used to give a remote user control over the workstation where the application runs.

There is thus a need for an approach that provides the better features associated with each of the above approaches, without their corresponding drawbacks.

Another requirement for efficient collaboration is the ability to audibly and/or visually interact with other participants in a session. Many of the collaborative applications presently available rely on a teleconference over regular telephone lines to provide this component of the meeting experience. Such an approach can be quite cumbersome, since it may require that the participants manage computers as well as telephones. Often only voices, and not visual images, are distributed. Some collaborative applications provide for the delivery of audio and video information over the same computer network used for the collaborative work. This leads to a much more "real" experience for the participants.

However, there remains a need for a solution that provides for scalable delivery of audio/video information, capable of adapting the a/v streams to the bandwidth available to each participant.

SUMMARY

One goal of the present invention is to provide a system, method, and software for synchronous collaborative work over a collection of computer workstations networked together that support a powerful, flexible, universal, and scalable model of n-way collaborative work. In a preferred embodiment, Acrobat's PDF standard is used for document representation, since it is both ubiquitous and more powerful than HTML. The PDF document standard includes support for a variety of document content types, including multimedia parts, along with a variety of annotation types. In the same preferred embodiment, the Adobe Acrobat applications ("Acrobat" and "Acrobat Reader") are used as the common application platform. These applications are enhanced with a plug-in module that is particularly suited to support synchronous collaborative work. The preferred plug-in module ties into each application's internal event processing engine, then propagates any events that occur in any one instance of the application that has joined a common session to all other participants in the same session, thus providing for a shared experience. The plug-in module preferably also provides audio/video services, to enable session participants to see and/or hear each other, when practical.

BRIEF DESCRIPTION OF DRAWINGS

FIG. 11 is a UML model depicting preferred core classes used in a preferred plug-in.

DETAILED DESCRIPTION

A preferred embodiment of the present invention enables collaborative work on a common application and minimizes overhead without sacrificing security of workstations used to participate in a collaborative session. A preferred method comprises installing a collaboration module (plug-in 120—see FIG. 1) within a common application 130. The plug-in 120 preferably interfaces with event processing mechanisms of the application 130 in at least two ways: (1) by tracking what operations each participant in a session executes on the participant's instance of the application 130, then propagating those same operations across a computer network to other instances of the application 130 participating in that session; and (2) by receiving event notifications (either directly or indirectly, from a session manager 110 who relays such notifications) from other participants' plug-ins during the session, and replicating those notifications as operations on the local instance of the application 130.

Figure 2:
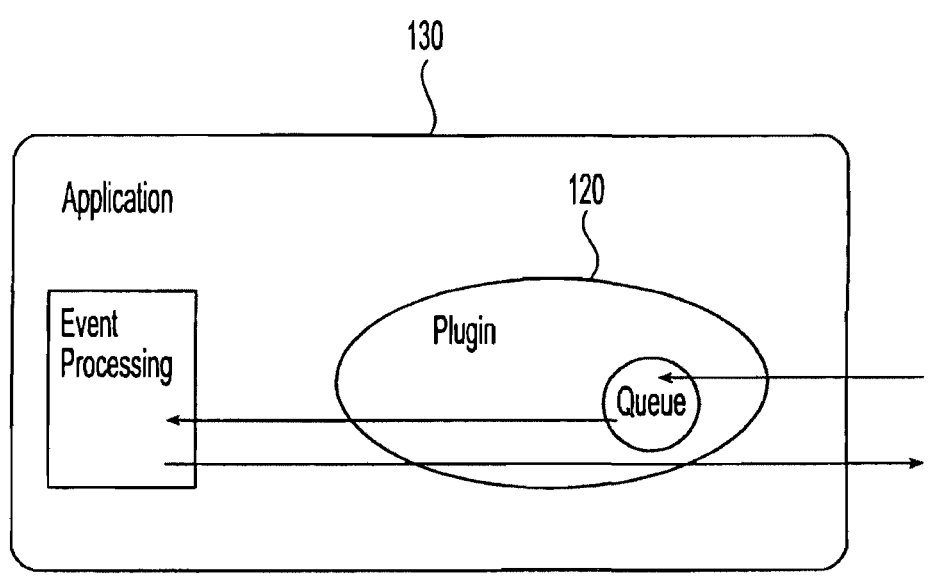
FIG. 2 depicts software architecture used in a preferred embodiment.

The method preferably comprises algorithms to resolve potential problems in synchronizing concurrent, conflicting operations. Typically, applications providing the ability for a plug-in 120 to interface with their own internal event processing are of two types: (1) those that support a "push" mode, in which delivery of events from the plug-in 120 to the application 130 occurs when the plug-in 120 receives the event; and (2) those that require a "pull" mode, in which delivery of events to the application 130 occurs at times the application designates. A preferred plug-in 120 can operate in either environment. When an application 130 requires "pull" delivery of events, the plug-in 120 queues events received from the session until the application 130 is ready to handle them. But when "push" delivery of events to the application 130 is possible, events do not need to be queued. FIG. 2 illustrates this architecture. Since communications protocols of a preferred embodiment of the invention propagate application-level events, those protocols are more efficient than lower-level, platform-specific events, in that network overhead is minimized.

Figure 1:
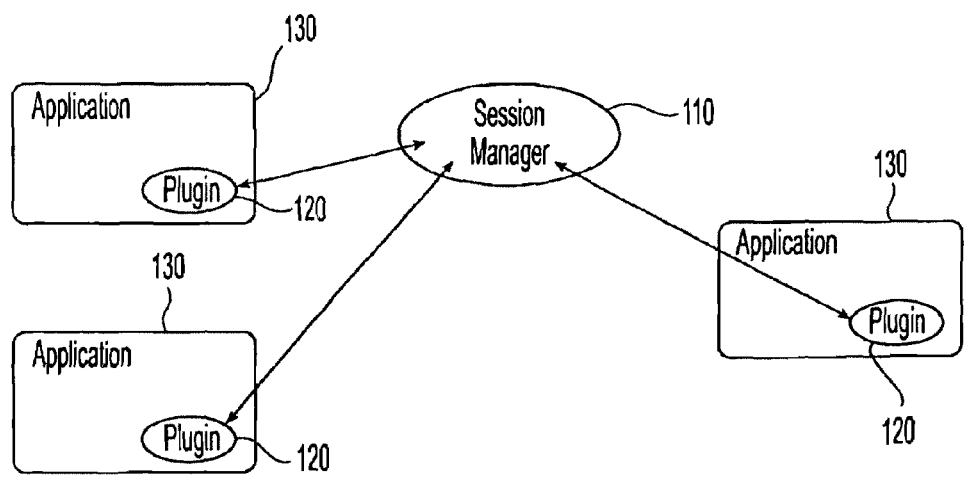
FIG. 1 depicts a computer network used in a preferred embodiment of the invention.

In one embodiment, preferred plug-ins 120 communicate with each other via a central session manager 110 that acts as a relay station, in what is commonly known as a "star network" (see FIG. 1). This guarantees that each of the session participants only needs to pay the network overhead associated with their own participation in the session; only the session manager 110 needs to pay overhead proportional to the "size" (number of participants) in a session. Such a session manager 110 can be provided as a service by a service provider (such as an ISP), or can be supplied by one of the participants in the session. That is, in one embodiment, the session manager 110 is incorporated with the plug-in 120 used by one of the participants.

The security of workstations participating in a session is guaranteed at two levels: (1) communications across instances of the application 130 in a common session are limited to events meaningful only within that application—any other resources present on any participating workstation are ignored; and (2) a preferred plug-in 120 propagates no events that could have an effect outside the application.

Privacy of a session also is guaranteed at two levels: (1) in order to receive notifications of events from other participants' workstations, a participant must join a session, and join protocols can prevent unauthorized parties from joining in; and (2) communications over a network that links workstations in a session can be encrypted, to prevent eavesdropping.

To illustrate in detail how a preferred embodiment of the method works, a sample implementation is described below, wherein Adobe Acrobat is used as the common application 130.

Assume for the purposes of this example that a number of session manager 110 servers are available somewhere on the Internet, and assume that there is also a session server directory available through some web site. However, the prior existence of a session manager server is not required. A creator of a new session preferably can configure his or her own instance of the application 130 to act as a session manager 110 for a particular session.

Figure 3:
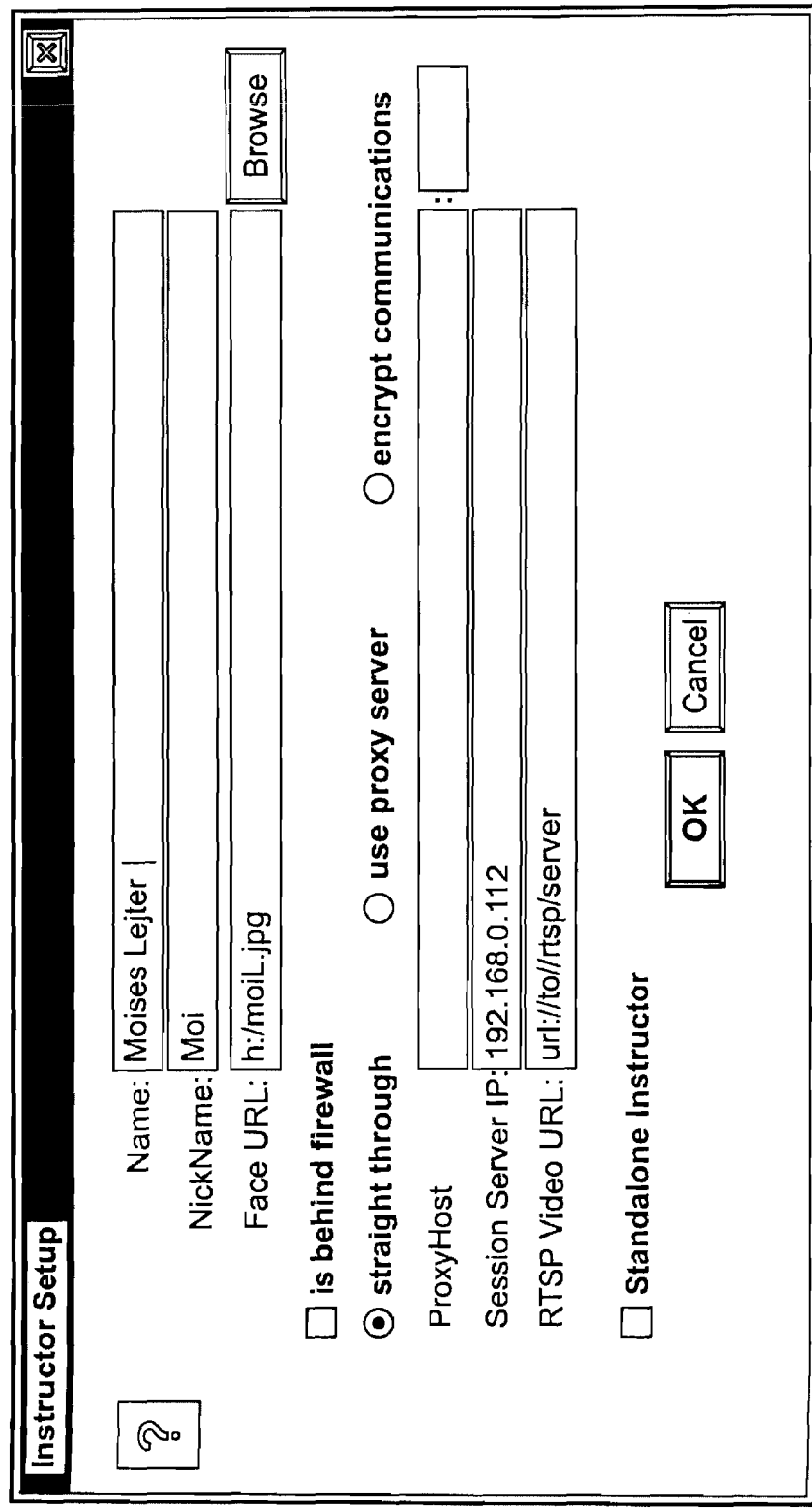
FIG. 3 depicts a user interface directed to an "owner" of a collaborative session using a preferred embodiment.
Figure 4:
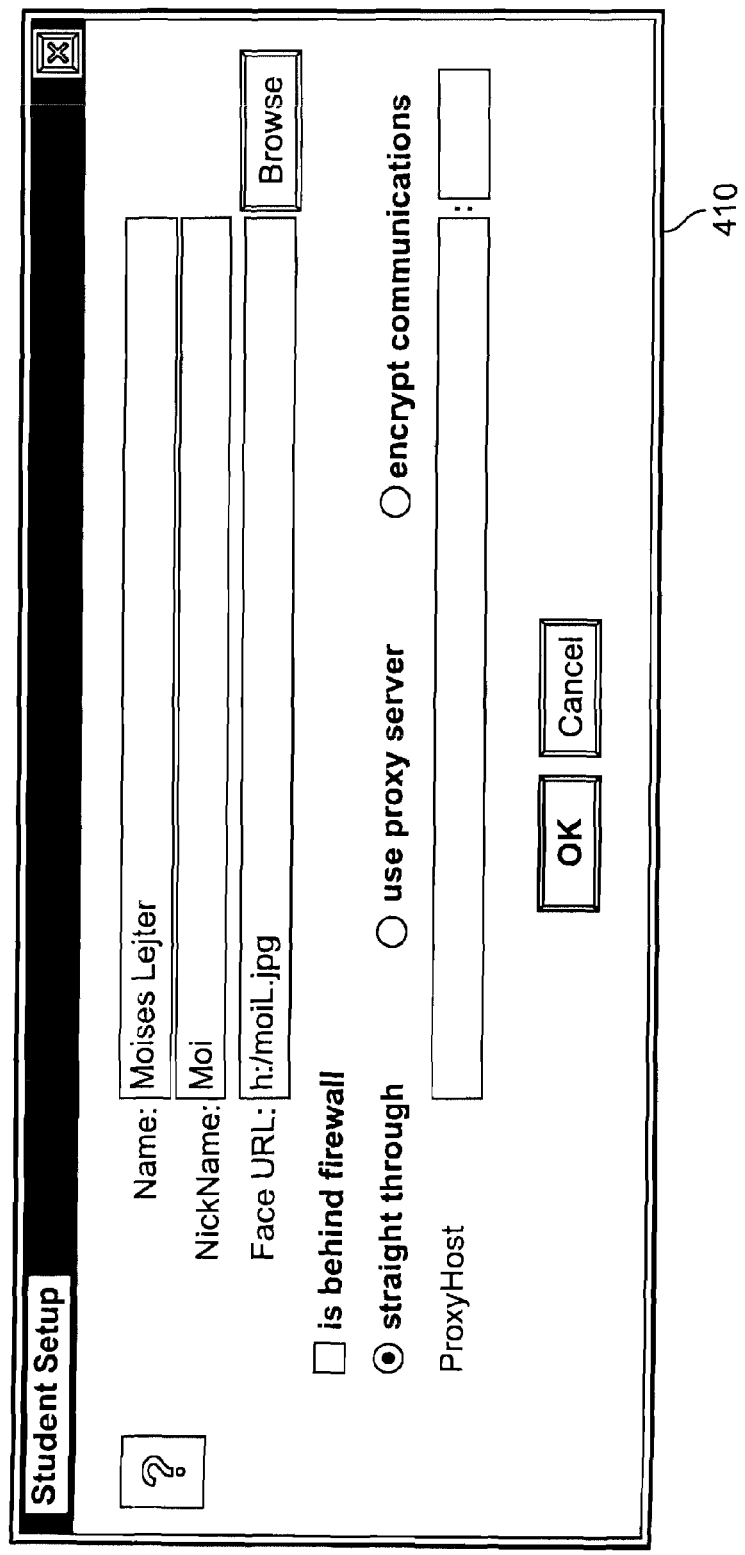
FIG. 4 depicts a user interface directed to a participant in a collaborative session using a preferred embodiment.

To begin a collaborative session, the participant who will "manage" the session (the "owner") preferably first starts up an instance of the application 130 to be run, so that the owner can then create a session for everyone else to join. After the owner starts the application 130, he enters configuration data for himself into a form 310 (see FIG. 3). The owner's configuration data preferably includes information sufficient to identify him within the session, along with configuration data to be used in case a direct connection from this application 130 to others on the Internet is not possible (the address and port number used for a proxy server to act as a relay for all communications, for example). Other participants in the session to be created ("users") need to enter similar information into a form 410 (see FIG. 4).

Figure 5:
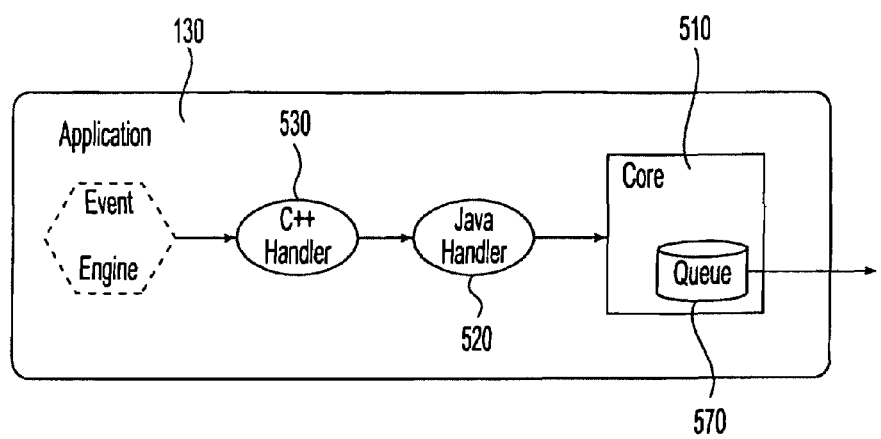
FIG. 5 illustrates sending of events within a preferred application.

When the application 130 starts up, it also starts up an instance of a preferred plug-in 120 that executes within the application 130. On startup, the plug-in 120 preferably registers with the application 130 the plug-in's interest in receiving notification of all interesting application-level events detected by the application 130. These events correspond to all operations performed by a user of that application 130. Opening and closing files, navigating within a file, and adding annotations to a file are examples of application-level events detected by Adobe's Acrobat. Acrobat preferably notifies the plug-in 120 of the occurrence of any of these events, as each happens. Code allowed to register as an event handler with Acrobat must be "native" C/C++ code. Since the core 510 (se FIG. 5) of a preferred plug-in 120 is written in Java, the interface between the Acrobat application 130 and the Java plug-in comprises two layers: (1) a set of C++ functions 530 individually written to register as handlers with each of the event types defined by Acrobat; and (2) a Java function 520 corresponding to each C++ function, to relay the handling of these events to the core of the Java plug-in 120. The processing of each event within a preferred plug-in 120 could be time-consuming; therefore, to hide any resulting delay from a user of the application 130, the plug-in 120 preferably queues up (in queue 510) events received from its own application 130, while the application 130 processes the next user request. FIG. 5 illustrates this architecture.

The instances of the preferred plug-in 120 that are part of a common session preferably do not interact with each other directly. Instead, to minimize network overhead paid by any one participant of the session, each instance of the plug-in 120 communicates with a central session manager 110. This session manager 110 acts as a distribution point and relay station, receiving each event notification from each plug-in 120 and re-transmitting it to all other plug-ins that participate in the same session. To minimize processing delay "perceived" by a sending plug-in 120, the session manager 110 also queues up event notifications it receives for processing. The plug-in 120 that transmits an event to the session manager 110 preferably receives an acknowledgment immediately, and continues execution while the session manager 110 goes on to retransmit the received event to every other plug-in 120 in that session.

Each plug-in 120 also receives event notifications from the central session manager 110. These event notifications are used to replicate on the application 130 associated with the receiving plug-in 120 the actions performed by the user on the application 130 associated with the sending plug-in 120. Again, to minimize the delay associated with the processing of the event on the receiving side, the receiving plug-in 120 queues up event notifications it receives and acknowledges them immediately to the central session manager 110. This enables the session manager 110 to continue processing while the receiving plug-in 120 processes the event it received.

Figure 6:
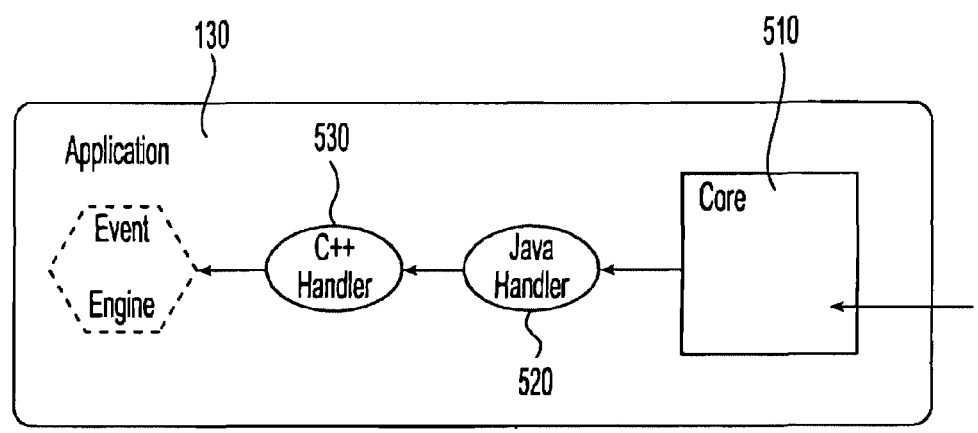
FIG. 6 illustrates a first preferred approach to receiving events within a preferred application.
Figure 7:
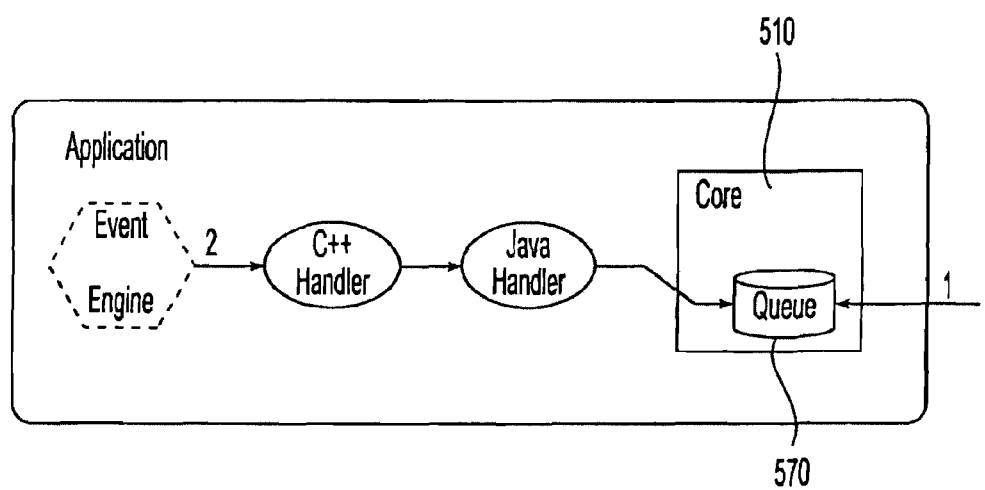
FIG. 7 illustrates a second preferred approach to receiving events within a preferred application.

In one embodiment, the application 130 associated with the plug-in 120 supports execution of commands corresponding to "pushed" event notifications received. In this case, the preferred plug-in 120 can proceed to invoke the commands associated with each event as it retrieves them from the queue 510. FIG. 6 illustrates this approach. However, it is also possible that the application 130 would not support such execution, but would rather require that commands be executed only when the application 130 thought it appropriate. In this second case, a preferred plug-in 120 keeps incoming event notifications in the arrival queue 510, and waits for the application 130 to request the delivery of an event. Such a request would entail the execution of the command associated with the event, but under the application's control and at its convenience. Adobe's Acrobat is an example of this second type of application. FIG. 7 illustrates this second approach.

One problem addressed by a preferred embodiment of the invention is related to the sequence of operations that the users of the individual instances of the application 130 in the session will observe their instance of the application 130 execute, taking into account the concurrent execution of operations by each of the users that need to be replicated across the session. If no special care were taken, each of the individual users could receive the sequence of operations in a different order, potentially depriving them of the desired common experience. To address this potential problem, a preferred embodiment comprises a method to sequence operations broadcast to all participants in a session that ensures that they do share a common experience.

Figure 8:
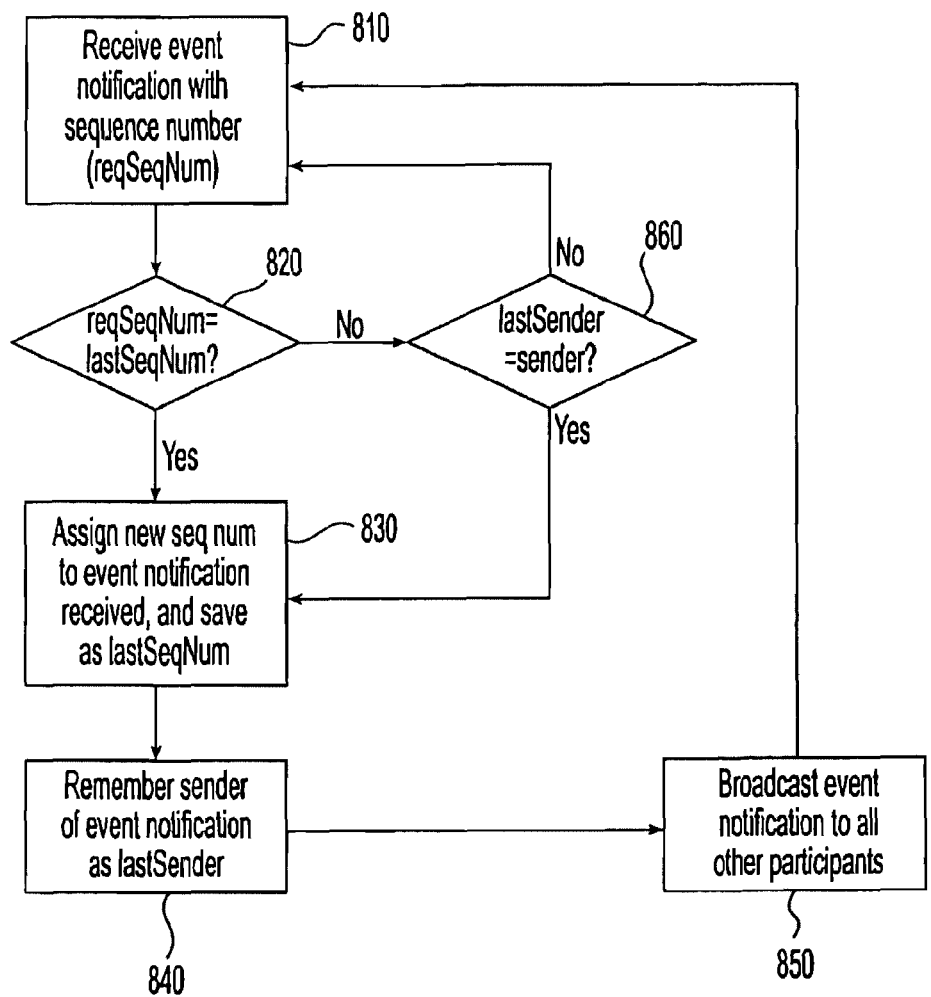
FIG. 8 illustrates a preferred method for providing a consistent experience to all participants in a collaboration session.

The preferred method comprises the following steps (see FIG. 8). At step 810 session manager 110 receives an event notification with the sequence number "reqSeqNum" of the last event received by the sending plug-in. At step 820 the session manager compares the received sequence number reqSeqNum to the number "lastSeqNum" of the last event broadcast by session manager 110. If the two numbers are equal, then at step 830 session manager 110 assigns a new sequence number to the received event notification, and save that number as lastSeqNum. At step 840 session manager 110 designates the participant plug-in from which it received the event notification as "lastSender." At step 850 session manager 110 broadcasts the received event notification to all participants (other than lastSender) and then waits to receive the next event notification at step 810.

However, if at step 820 reqSeqNum does not equal lastSeqNum, then at step 860 session manager 110 compares the sender of the notification to lastSender. If the two are the same, session manager 110 proceeds to step 830, for reasons discussed below. If the two are not the same, the received event notification is ignored, and session manager 110 waist to receive the next event notification at step 810.

Session-based event sequence numbers are assigned to each of the events that arrive at the session manager 110, before they are relayed to all the participants in the session. When a participant's plug-in 120 sends an event notification to the session manager 110, the notification comprises an event sequence number for the last event the plug-in 120 received. The session manager 110 preferably ignores event notifications from participants when the event sequence number that accompanies the request is lower than the last sequence number assigned. Such a scenario would typically only occur if the participant had yet to process an event that had already been sent out. In such a case, ignoring the notification will have the effect of giving that participant a chance to "catch up." The session manager 110 preferably may only accept the event notification, even if the event sequence number is not the last one used, when the participant plug-in 120 sending the notification was also the participant plug-in 120 that sent the notification corresponding to the last sequence number issued. In that case, that plug-in 120 may not have received its own event notification (there is often no need for a plug-in 120 to have received notification of its own events).

Figure 9B:
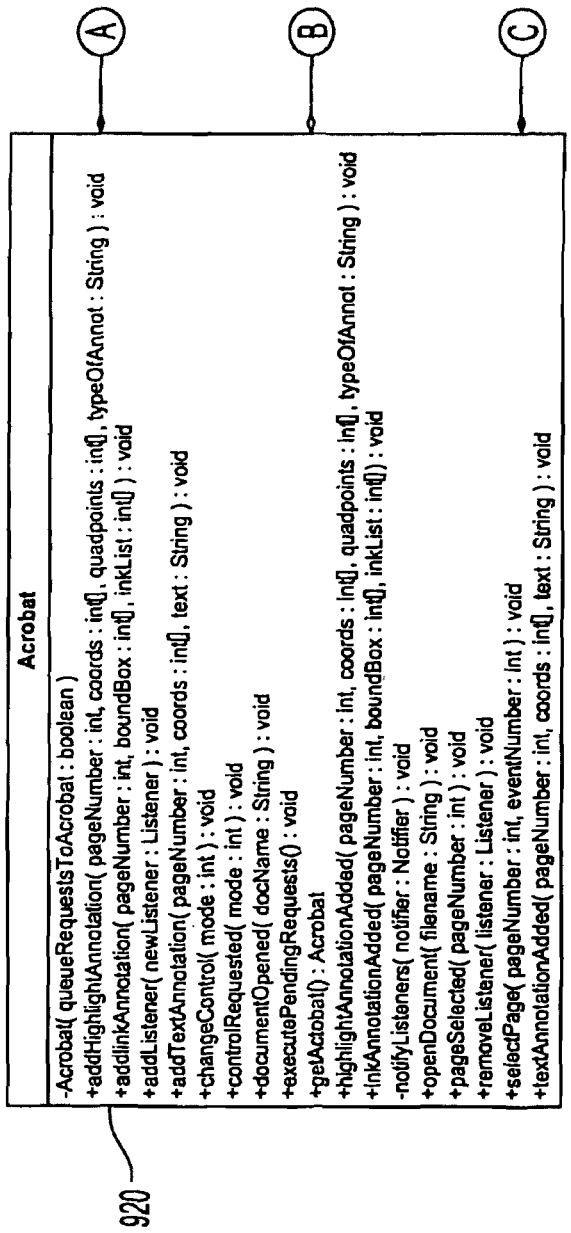
FIG. 9 is a UML model depicting preferred classes used for interaction with a preferred application.
Figure 9C:
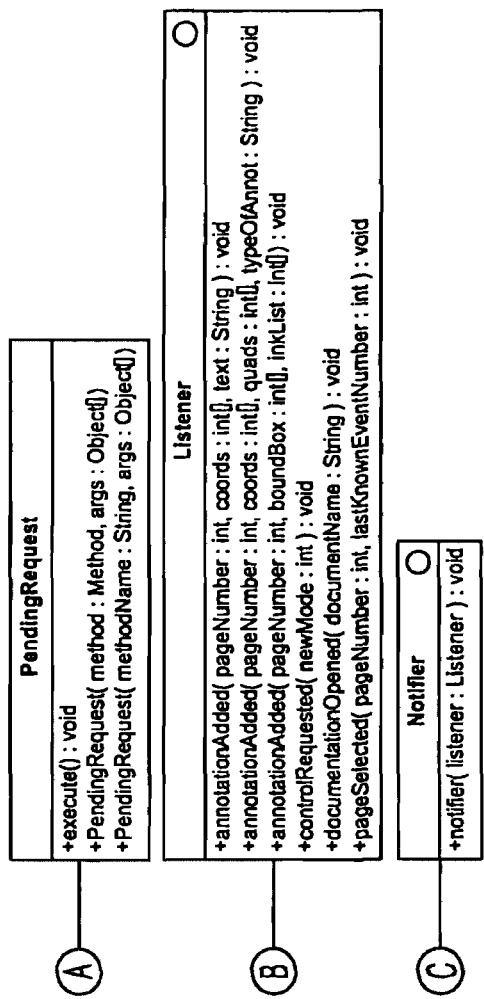
Figure 10A:
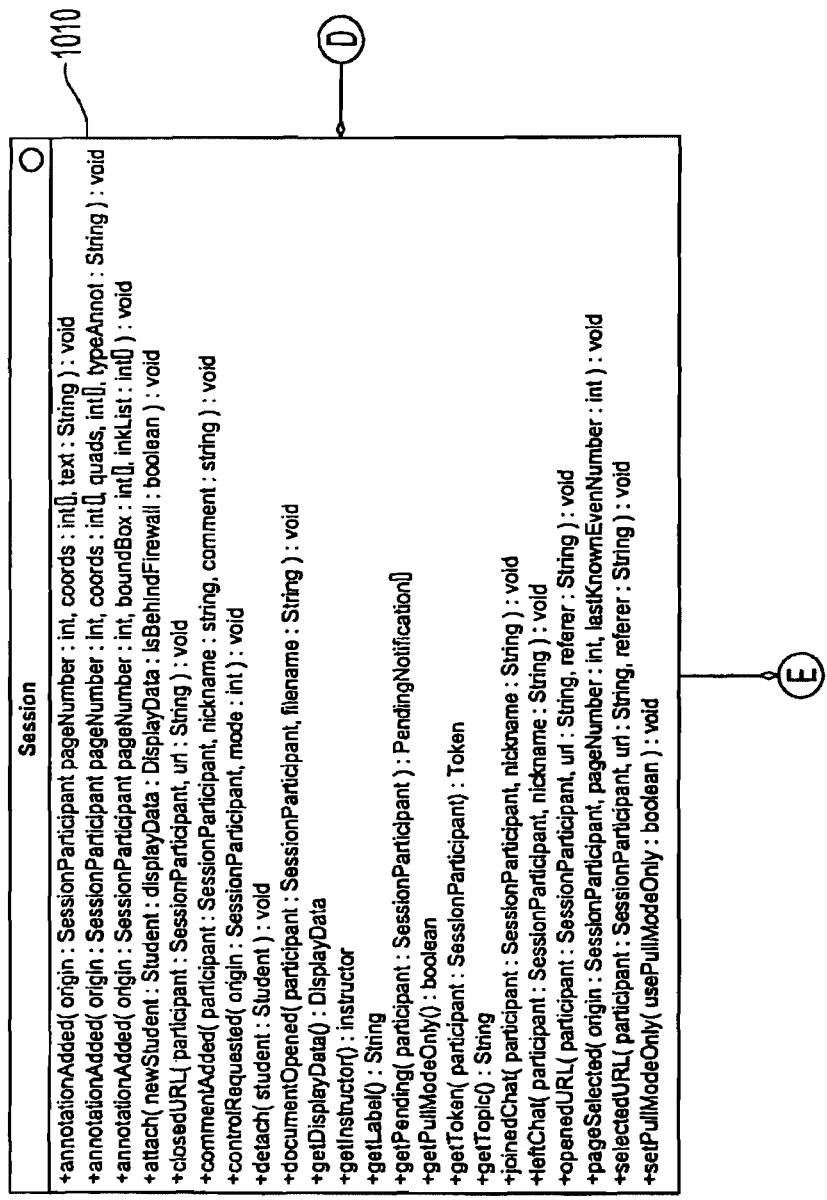
FIG. 10 is a UML model depicting preferred classes used for transmitting events across preferred plug-ins.
Figure 10B:
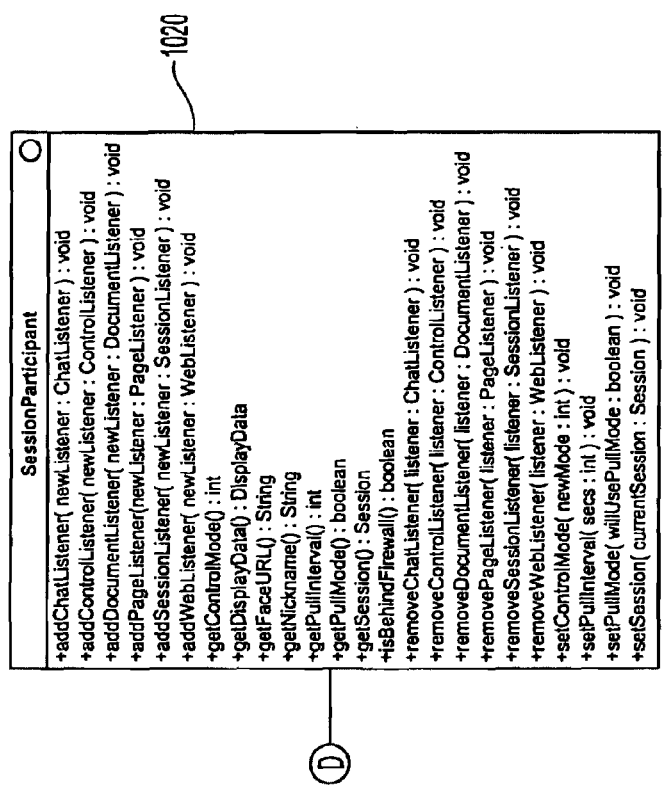
Figure 10C:
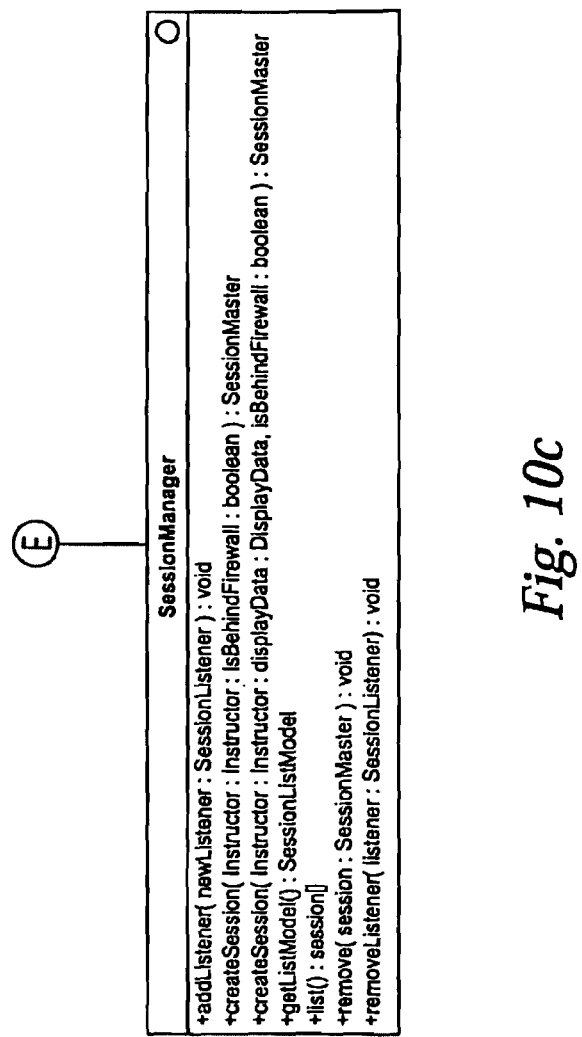
Figure 11A:
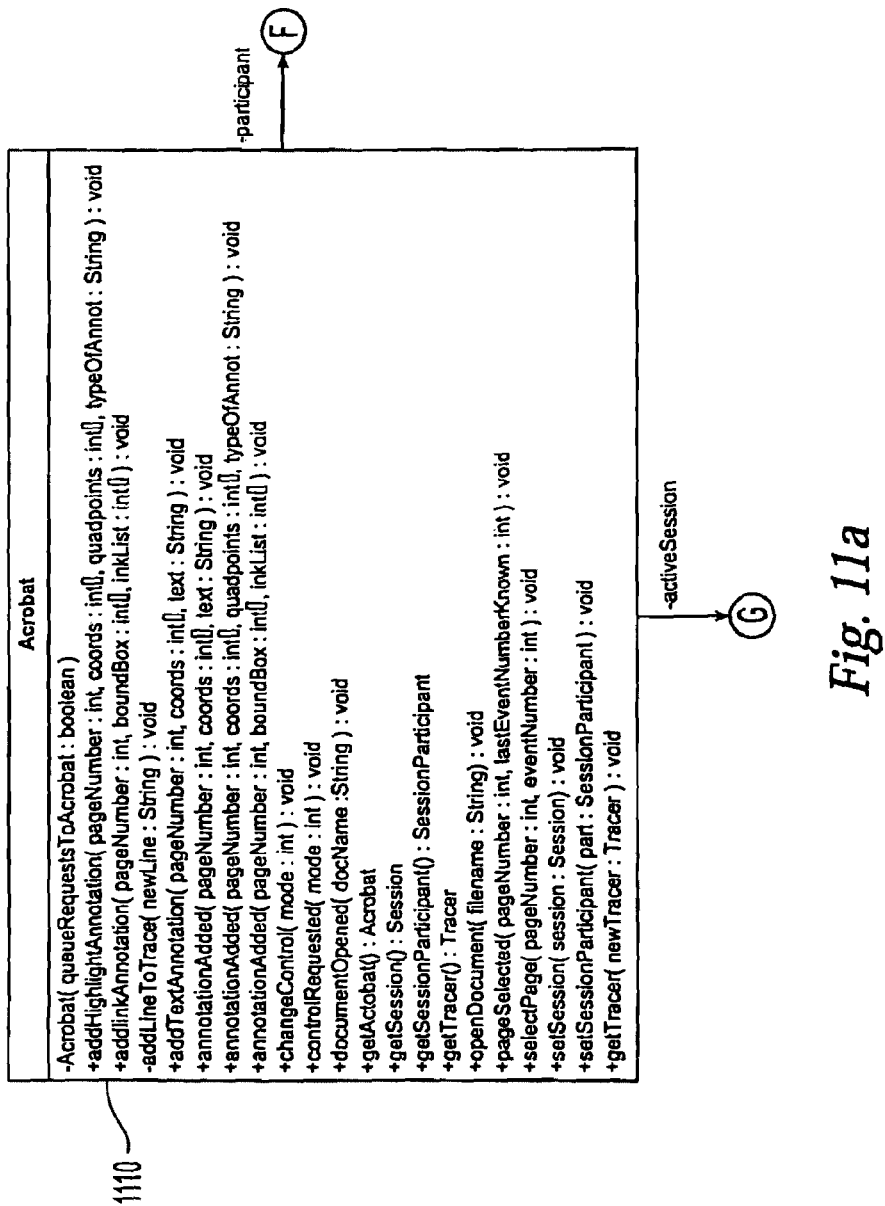
Figure 11B:
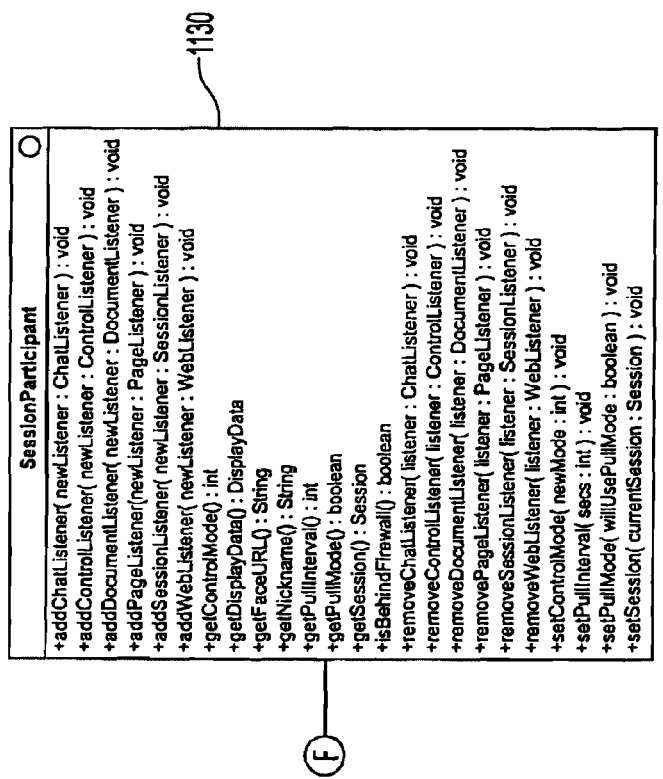
Figure 11C:
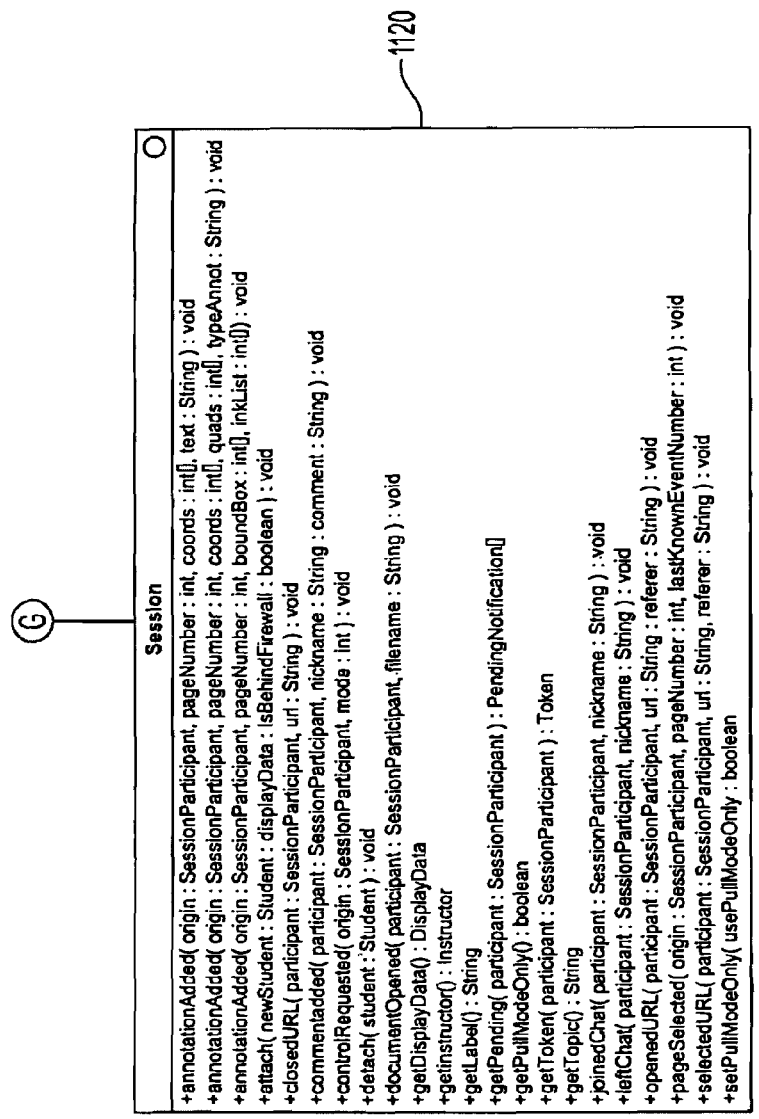

FIGS. 9 through 11 illustrate in more detail a sample implementation of the preferred method. FIG. 9 depicts a preferred UML model for code responsible for actual interaction between the application 130 and the plug-in 120. Type "AcrobatProxy" 910 is the Java description for "native" C++ code actually registered with the Acrobat event processing engine. Type "Acrobat" 920 is Java code invoked by native functions in order to hand off an event notification from the application 130 to its plug-in 120.

FIG. 10 depicts a preferred UML model for code responsible for communications across plug-ins. Type "Session" 1010 provides Java code used remotely by a sending plug-in 120 to communicate to a session manager 110 that a new event took place. Type "SessionParticipant" 1020 describes receiving plug-in 120s that receive event notifications from a session manager 110.

FIG. 11 depicts a preferred UML model for basic structure of a preferred plug-in 120. Type "Acrobat" 1110 is a description of Java code within a preferred plug-in 120 that is called to handle locally an event notification received from the application 130, or to relay back to the application 130 a request to execute an operation. Type "Session" 1120 is an object within the session manager 110 that plug-ins communicate events to. Type "SessionParticipant" 1130 is a description for code within a preferred plug-in 120 that receives notifications from a session manager 110 and passes them on to code described by the Acrobat class for processing.

While the invention has been described with respect to the preferred embodiments, those skilled in the art will recognize that numerous variations and modifications may be made without departing from the scope of the invention. Accordingly, it should be clearly understood that the embodiments described above are not intended as restrictions on the scope of the invention, which is limited only by the following claims.

The invention claimed is:

1. A method for collaboration over a computer network, comprising:
    intercepting data regarding one or more application level events that occur within a first instance of a stand-alone application operable to create and edit to documents in response to user actions, and wherein the one or more application level events reflect user actions that result in changes to a native document file generated by the first instance of stand-alone application;

transmitting data comprising the native document file and the data regarding one or more application level events over the computer network, automatically and in real time, to a second instance of the stand-alone application; and causing the second instance of the stand-alone application:
to display a local copy of a document corresponding to a local copy of the native document file,
to receive and use the data comprising data regarding one or more application level events to replicate the events that occurred within the first instance,
to mirror the user actions performed in the first instance without user intervention by performing an equivalent action on the local copy of the native document file and thereby make corresponding changes to the local copy of the native document file, and
to display the changes to the local copy of the document, wherein no events that have an effect outside the stand-alone application are propagated to provide security of the collaboration.

2. A method as in claim 1, wherein the one or more application level events include adding annotations to the document in response to the user actions, and wherein the changes displayed to the local copy of the document include the added annotations.

3. A method as in claim 1, wherein the stand-alone application is Adobe Acrobat.

4. A method as in claim 1, wherein the second instance of the stand-alone application is further configured to queue received event notifications.

5. A method as in claim 4, wherein the second instance of the stand-alone application controls retrieval of the queued event notifications from multiple participants and resolves conflicts between the events.

6. A method as in claim 1, wherein the data regarding one or more application level events is transmitted to the second instance via a session manager, and in which conflict resolution between events from different sources is performed by the session manager.

7. A method of claim 1, wherein the stand-alone application comprises a document viewer viewing a first copy of a native document file generated by the first instance of the stand-alone application.

8. A method as in claim 7, wherein the application is Adobe Acrobat or Adobe Reader.

9. A method as in claim 1, wherein the application level events comprise one or more text changing events.

10. A method as in claim 1, further comprising saving the local copy of the native document file with changes including the added annotations made by the replicated events incorporated therein.

11. A method as in claim 1, wherein the second instance of the stand-alone application detects conflicts between the application level events and resolves detected conflicts between the application level events without requiring user intervention.

12. A method as in claim 1, wherein a session manager detects conflicts between the application level events and resolves the detected conflicts using sequence numbers assigned to the application level events and without requiring user intervention.

13. A computer readable storage medium storing software for collaboration over a computer network, comprising:

a software plug-in operable to intercept data regarding application level events that occur within a first instance of a stand-alone application operable to create and edit documents in response to user actions, and to which the first instance of the software plug-in has been plugged in and wherein the one or more application level events reflect user actions that result in changes to a native document file generated by the first instance of stand-alone application are delivered to the plug-in, wherein a sequence number is assigned to each of the one or more application level events to resolve any conflicts between the one or more application level events;

wherein the software plug-in is further operable to receive data regarding one or more application level events that occur within a second instance of the stand-alone application and are transmitted over the computer network from a second instance of the plug-in plugged into the second instance of the stand-alone application, wherein the instances of stand-alone application are separate instances;

wherein the first instance of the software plug-in is further operable to use the received data regarding one or more application level events to replicate the events that occurred within the second instance of the stand-alone application, using the first instance of the stand-alone application to mirror the user actions performed on the second instance by performing an equivalent action including on a local copy of the native document file, and to display the changes to the local document corresponding to the native document file, automatically, in real time, and without user intervention, and wherein communications over the computer network that links workstations in a session are encrypted to preserve privacy of a session.

14. A computer readable storage medium storing software as in claim 13, wherein the stand-alone application is Adobe Acrobat.

15. A computer readable storage medium storing software as in claim 13, wherein the data regarding one or more application level events is transmitted by the second instance via a session manager.

16. A computer readable storage medium storing software as in claim 13, wherein the first instance of the stand-alone application detects conflicts between the application level events and resolves detected conflicts between the application level events without requiring user intervention.

17. A computer readable storage medium storing software as in claim 13, wherein the session manager detects conflicts between the application level events and resolves the detected conflicts using a sequence numbers assigned to the application level events and without requiring user intervention.

18. A method for collaboration over a computer network, comprising:

intercepting data regarding one or more application level events that occur within a first instance of a stand-alone application operable to create and edit documents in response to user actions, and wherein the one or more application level events reflect user actions that result in changes to a native document file generated by the first instance of stand-alone application wherein a sequence number is assigned to each of the one or more application level events to resolve any conflicts between the one or more application level events;

transmitting data comprising the native document file and the data regarding one or more application level events over the computer network, automatically and in real time, to a one or more other instances of the stand-alone application, wherein the instances of stand-alone application are separate instances running only on workstations operated by users;

receiving data regarding one or more application level events that reflect user actions that result in changes to a native document file generated by one or more other instances of stand-alone application; and causing the first instance of the stand-alone application:
- to use the received data comprising data regarding one or more application level events to replicate the events that occurred within the one or more other instances,
- to mirror the user actions performed in the one or more other instances by performing an equivalent action on the local copy of the native document file and thereby make corresponding changes to the local copy of the native document file, and
- to display the changes to the local copy of the document, wherein no events that have an effect outside the stand-alone application are propagated to provide security of the collaboration.

19. A method as in claim 18, further comprising causing a session manager to detect and resolve conflicts caused by user actions performed in said one or more other instances.

20. A method as in claim 18, wherein said session manager detects and resolves conflicts using said sequence numbers assigned to said application level events.

* * * * *

UNITED STATES PATENT AND TRADEMARK OFFICE
CERTIFICATE OF CORRECTION

PATENT NO. : 8,578,280 B2  Page 1 of 1
APPLICATION NO. : 13/229371
DATED : November 5, 2013
INVENTOR(S) : John J. Mohan et al.

It is certified that error appears in the above-identified patent and that said Letters Patent is hereby corrected as shown below:

On the Title page, in item (75) Inventors: Stephen Greene: delete "CA (US)" and insert therefor --(CA)--.

Signed and Sealed this
Seventh Day of October, 2014

Michelle K. Lee
*Deputy Director of the United States Patent and Trademark Office*